United States Patent
Jung

(10) Patent No.: US 12,387,064 B2
(45) Date of Patent: Aug. 12, 2025

(54) SMART TERMINAL ACCESSORY-BASED MEMBERSHIP-ONLY SERVICE PLATFORM AND METHOD THEREOF

(71) Applicant: SLASH B SLASH Co., Ltd, Busan (KR)

(72) Inventor: Yong Chae Jung, Seongnam-si (KR)

(73) Assignee: SLASH B SLASH Co., Ltd (KR)

( * ) Notice: Subject to any disclaimer, the term of this patent is extended or adjusted under 35 U.S.C. 154(b) by 0 days.

(21) Appl. No.: 18/495,737

(22) Filed: Oct. 26, 2023

(65) Prior Publication Data
US 2024/0211706 A1    Jun. 27, 2024

(30) Foreign Application Priority Data
Dec. 27, 2022  (KR) .......................... 10-2022-0185367

(51) Int. Cl.
G06Q 50/10 (2012.01)
G06K 7/10 (2006.01)
G06Q 30/018 (2023.01)

(52) U.S. Cl.
CPC ................................ *G06K 7/10297* (2013.01)

(58) Field of Classification Search
CPC ........... G06K 7/10297; G06K 7/10366; G06K 19/072; G06K 19/0723; G06Q 30/0267; G06Q 20/325; G06Q 20/3224; G06Q 20/321; G06Q 20/3278; G06Q 20/322; G06Q 20/3223; G06Q 20/326; G06Q 20/3226; G06Q 20/3227; G06Q 20/32
See application file for complete search history.

(56) References Cited

U.S. PATENT DOCUMENTS

2016/0166936 A1*  6/2016  Millegan ................. G06F 21/35
                                                                463/29
2021/0152366 A1*  5/2021  Wang ..................... G06F 21/645

FOREIGN PATENT DOCUMENTS

| EP | 3075085 B1 * | 1/2020 | ............. G06F 1/163 |
| JP | 2004004157 A | 1/2004 | |
| JP | 2008251019 A | 10/2008 | |
| JP | 2018101971 A | 6/2018 | |

(Continued)

OTHER PUBLICATIONS

Billinghurst, "Wearable devices: new ways to manage information" (Year: 2002).*
App Development Recipes for iOS and watchOS (Year: 2016).*

*Primary Examiner* — Thien T Mai
(74) *Attorney, Agent, or Firm* — Renaissance IP Law Group LLP

(57) ABSTRACT

Provided is a smart terminal accessory-based membership-only service platform and a method thereof. The smart terminal accessory-based membership-only service platform according to an embodiment of the present inventive concept includes: a management server for authenticating NFC information requested from a user terminal that identifies an NFC tag from a smart terminal accessory embedded with the NFC tag by means of NFC tagging, and registering the user terminal as a user of the smart terminal accessory; and a service server for registering and interconnecting the user terminal as a member in response to a request from the management server, and providing a membership-only service corresponding to the smart terminal accessory and requested from the user terminal.

10 Claims, 3 Drawing Sheets

(56) References Cited

FOREIGN PATENT DOCUMENTS

| KR | 20150098609 | A | | 8/2015 | | |
|----|-------------|---|---|--------|---|---|
| KR | 20170017229 | A | | 2/2017 | | |
| KR | 20190125199 | A | | 11/2019 | | |
| KR | 20220047174 | A | | 4/2022 | | |
| WO | 2011155072 | A1 | | 12/2011 | | |
| WO | WO-2015199827 | A1 | * | 12/2015 | ............. | G06F 1/163 |

* cited by examiner

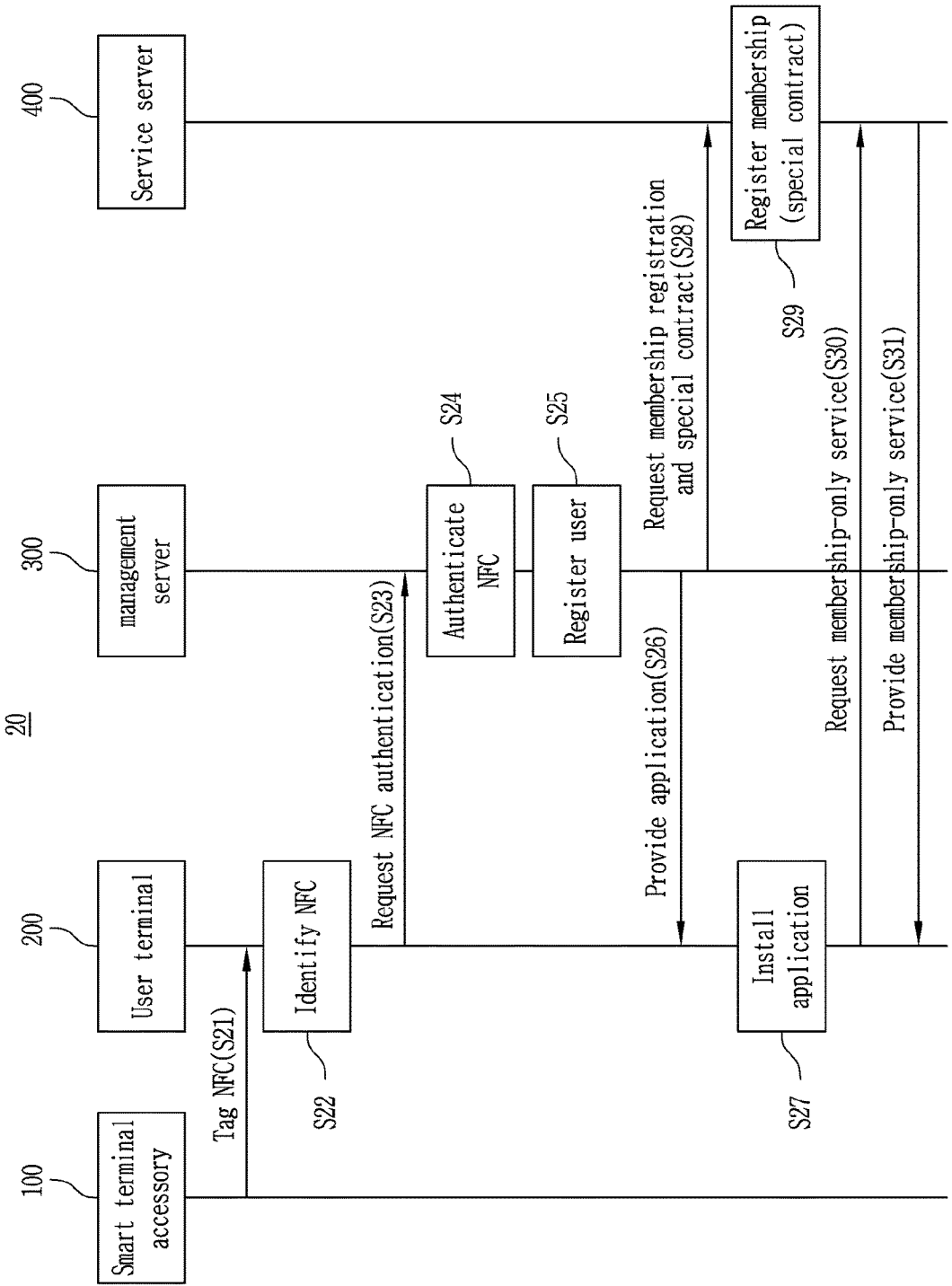

SMART TERMINAL ACCESSORY-BASED MEMBERSHIP-ONLY SERVICE PLATFORM AND METHOD THEREOF

BACKGROUND

Technical Field

The present inventive concept relates to a smart terminal accessory-based membership-only service platform and a method thereof, and particularly, to a smart terminal accessory-based membership-only service platform and a method thereof, which can interconnect various membership-only services through authentication of an NFC tag embedded in a smart terminal accessory.

Background of the Related Art

Recently, use of NFC tag is increasing as it is attached to a corresponding product and provides various information to a user. By tagging an NFC tag to a smart terminal such as a smartphone or the like, information stored the NFC tag may be transmitted to the smart terminal.

As a service using the NFC tag, a smart terminal tagging the NFC tag communicates with a corresponding server using NFC information stored in the NFC tag and receives related information from the server. For example, as a service using the NFC tag, a smart terminal receives information on a corresponding product registered in a corresponding server or downloads contents provided by the server.

However, as conventional services using the NFC tag are not used for a special purpose after interconnecting related contents, its use is limited to one-time use. As the NFC tag is discarded thereafter, it may cause environmental pollution.

Therefore, a platform capable of continuously interconnecting various services according to NFC tagging is required.

SUMMARY

Therefore, the present inventive concept has been made in view of the above problems, and it is an object of the present inventive concept to provide a smart terminal accessory-based membership-only service platform and a method thereof, which can interconnect various membership-only services through authentication of an NFC using a smart terminal accessory.

To accomplish the above object, according to one aspect of the present inventive concept, there is provided a smartphone accessory-based membership-only service platform comprising: a management server for authenticating NFC information requested from a user terminal that identifies an NFC tag from a smart terminal accessory embedded with the NFC tag by means of NFC tagging, and registering the user terminal as a user of the smart terminal accessory; and a service server for registering and interconnecting the user terminal as a member in response to a request from the management server, and providing a membership-only service corresponding to the smart terminal accessory and requested from the user terminal.

In an embodiment, when a request for authenticating the identified NFC information is received from the user terminal, the NFC authentication unit may authenticate the identified NFC information according to identification information of the NFC tag.

In an embodiment, the management server may determine the user terminal requesting authentication of the NFC information as a real owner of the smart terminal accessory in correspondence to the NFC information and register the user terminal as a user, and provide an application related to the membership-only service to the user terminal to install.

In an embodiment, the management server may request registration of membership and setting of special contracts by transmitting the registered user information and a membership-only service related to the NFC information to the service server.

In an embodiment, the service server may register the user terminal as a member corresponding to the NFC information in response to a request from the management server, match the user terminal and a corresponding special contract, and provide a membership-only service matched as a special contract in response to a request of the user terminal.

According to another aspect of the present inventive concept, there is provided a smartphone accessory-based membership-only service method comprising the steps of: identifying an NFC tag from a smart terminal accessory embedded with the NFC tag by means of NFC tagging, by a user terminal; authenticating NFC information requested from the user terminal, by a management server; registering the user terminal as a user of the smart terminal accessory, by the management server; registering the user terminal as a member in response to a request from the management server, by the service server; and providing a membership-only service corresponding to the smart terminal accessory and requested from the user terminal, by the service server.

In an embodiment, the authenticating step may include the steps of: receiving a request for authenticating the identified NFC information from the user terminal; and authenticating the identified NFC information according to identification information of the NFC tag.

In an embodiment, the step of registering as a user may include the steps of: receiving a request for authenticating the NFC from the user terminal; determining the user terminal requesting authentication of the NFC information as a real owner of the smart terminal accessory in correspondence to the NFC information and registering the user terminal as a user; and providing an application related to the membership-only service to the user terminal to install.

In an embodiment, the step of registering as a member may include the step of requesting registration of membership and setting of special contracts by transmitting the registered user information and a membership-only service related to the NFC information to the service server, by the management server.

In an embodiment, the registering step may include the steps of: registering the user terminal as a member corresponding to the NFC information in response to a request from the management server; and matching the user terminal and a corresponding special contract. Here, the providing step may include the steps of: receiving a request for a membership-only service matched to a corresponding special contract from the user terminal; and providing the matched membership-only service to the user terminal in response to the request of the user terminal.

As the smart terminal accessory-based membership-only service platform and a method thereof according to an embodiment of the present inventive concept is connected to a service server by performing NFC authentication using a smart terminal accessary in a smart terminal, and thus may interconnect various membership-only services provided by the service server, continuity of service can be improved.

In addition, as the smart terminal accessory-based membership-only service platform and a method thereof according to an embodiment of the present inventive concept provides NFC authentication, membership registration, and applications simply by applying a smart terminal accessory to a smart terminal of a user, and thus may be easily used without the need of special handling or setting, convenience of use and scalability can be improved.

In addition, as the smart terminal accessory-based membership-only service platform and a method thereof according to an embodiment of the present inventive concept applies a smart terminal accessory to a smart terminal of a user so that the accessory may be seen each time it is used or may be easily identified by other people, and thus may provide a sense of belonging as a special member or a sense of satisfaction with a special service, loyalty of membership can be improved.

In addition, as the smart terminal accessory-based membership-only service platform and a method thereof according to an embodiment of the present inventive concept may continuously use a smart terminal accessory according to its usage and continuously provide associated services at the same time, and thus may reduce the amount of waste of NFC tags, it may contribute to improving the environment.

BRIEF DESCRIPTION OF THE DRAWINGS

FIG. 4 is a flowchart illustrating a smart terminal accessory-based membership-only service method according to an embodiment of the present inventive concept.

DETAILED DESCRIPTION OF THE PREFERRED EMBODIMENT

Figure 1:
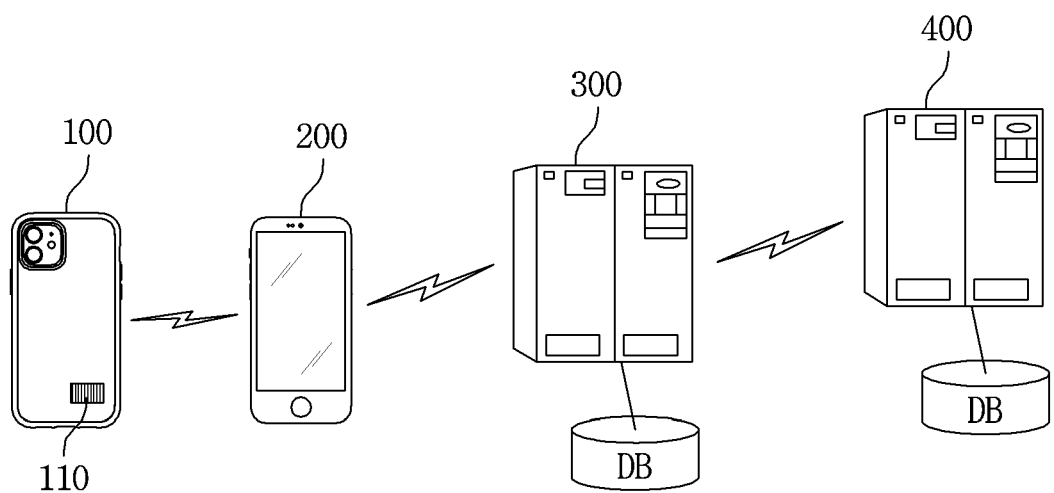
FIG. 1 is a view showing the configuration of a smart terminal accessory-based membership-only service platform according to an embodiment of the present inventive concept.

Hereinafter, embodiments of the present inventive concept will be described in detail with reference to the attached drawings so that those skilled in the art may easily implement the present inventive concept. The present inventive concept may be implemented in various different forms and is not limited to the embodiments described herein. Parts not related to the description are omitted from the drawings to clearly describe the present inventive concept, and the same reference numerals are given to identical or similar components throughout the specification.

Hereinafter, a smart terminal accessory-based membership-only service platform according to an embodiment of the present inventive concept will be described in more detail with reference to the drawings. FIG. 1 is a view showing the configuration of a smart terminal accessory-based membership-only service platform according to an embodiment of the present inventive concept.

Referring to FIG. 1, a smart terminal accessory-based membership-only service platform 10 according to an embodiment of the present inventive concept includes a smart terminal accessory 100, a user terminal 200, a management server 300, and a service server 400.

The smart terminal accessory-based membership-only service platform 10 is a system for providing specially contracted various membership-only services in association with the service server 400 by means of NFC tagging using a smart terminal accessory, which is a system that provides both NFC authentication and service provision in association with the management server 300 and the service server 400. Here, the membership-only service may be a special service agreed upon in advance as a special contract in association with the smart terminal accessory 100.

As the smart terminal accessory-based membership-only service platform 10 is provided with the management server 300, in addition to the service server 400, to manage the user terminal 200 through management of NFC information and special contracts, the smart terminal accessory-based membership-only service platform 10 is in charge of promotion such as attracting customers of the service server 400 and the like and may guarantee reliability of legitimate users. Here, the operating company of the management server 300 is in charge of manufacturing and selling the smart terminal accessory 100.

The service server 400 may provide a previously agreed special contract service to a corresponding user terminal 200 for authenticated legitimate users who have purchased the smart terminal accessory 100. Therefore, the operating company of the service server 400 may reduce the burden of promotion for attracting customers and avoid risks in manufacturing and selling the smart terminal accessory 100.

The smart terminal accessory 100 is sold separately without regard to the user terminal 200, and may be sold through promotions for membership-only services provided by the service server 400.

The smart terminal accessory 100 may be embedded with an NFC tag 110. Here, the NFC tag 110 may include an NFC antenna and an NFC chip. At this point, the smart terminal accessory 100 may be a device additionally used for a smart terminal. For example, the smart terminal accessory 100 may be a smart terminal case. Here, the smart terminal case may be provided to cover the lateral and rear sides of the smart terminal, excluding the display. The smart terminal accessory 100 may be mounted on the user terminal 200 to be continuously used for protection or aesthetics purposes.

Here, the NFC chip may store NFC information. At this point, the NFC information may include the address of the management server 300 and identification information of its own. That is, the NFC information may include IP address information of the management server 300 that the user terminal 200 may automatically access at the same time as NFC tagging. In addition, the NFC information may include identification information issued to identify the NFC tag 110.

The user terminal 200 may be a terminal of a user who purchases the smart terminal accessory 100. Here, the user terminal 200 is a smart terminal and may be a portable electronic device such as a smartphone, a laptop computer, a smart pad, or the like. The user terminal 200 is not particularly limited in the form as long as it has an NFC tagging function and a communication function.

When the smart terminal accessory 100 is mounted, the user terminal 200 may automatically perform NFC tagging to identify the NFC tag. At this point, the user terminal 200 may be in a state in which the NFC function is activated. That is, the user terminal 200 may receive and identify NFC information stored in the NFC tag 110 through NFC tagging.

The user terminal 200 may request authentication of the NFC tag by transmitting the identified NFC information to the management server 300. Here, the user terminal 200 may access the IP address of the management server 300 included in the NFC information. At this point, the user terminal 200 may transmit its own identification information to the management server 300, together with the NFC information. For example, the user terminal 200 may transmit the phone number of its smart terminal to the management server 300 as identification information.

The user terminal 200 may receive an application from the management server 300 and install the application. Here, the application may be an application related to a membership-only service corresponding to the NFC information. That is, the user terminal 200 may be provided with services of the service server 400 through the installed application.

The user terminal 200 may request a membership-only service from the service server 400. That is, the user terminal 200 may request a registered special contract service through the management server 300.

The management server 300 performs NFC authentication requested from the user terminal 200. At this point, the management server 300 may authenticate the NFC information transmitted from the user terminal 200. In addition, the management server 300 may register the user terminal 200 as a user of the smart terminal accessory 100. Detailed description of the management server 300 will be described below with reference to FIG. 3.

The service server 400 may register the user terminal 200 as a member in response to a request from the management server 300. That is, the service server 400 may register the user terminal 200 as a member corresponding to the authenticated NFC information in response to a request from the management server 300. At this point, the service server 400 may register the identification information of the user terminal 200 as membership information.

The service server 400 may match a special contract requested from the management server 300 with the user terminal 200. Here, the special contract may be a previously agreed special service to be provided by the service server 400 in association with the NFC information. For example, the special contract may include additional services provided through specially progressed events or promotions, in addition to the services provided by signing up as a general member. That is, the service server 400 may match to provide a special contract previously agreed with the management server 300 to the user terminal 200 of corresponding membership. At this point, the service server 400 may interact with the user terminal 200 according to registration of membership of the user terminal 200.

The service server 400 may provide a membership-only service corresponding to the smart terminal accessory 100 in response to a request for the membership-only service of the user terminal 200. That is, the service server 400 may provide a previously agreed special contract service to the user terminal 200.

Meanwhile, the service server 400 may provide follow-up services or associated services related to the special contract service to the user terminal 200, regardless of the request of the user terminal 200. For example, when a new promotion is generated for specific members, the service server 400 may provide the new promotion to corresponding user terminals 200.

As described above, as the smart terminal accessory-based membership-only service platform 10 according to an embodiment of the present inventive concept is connected to the service server 400 by performing NFC authentication using the smart terminal accessary 100 in the smart terminal, and thus may interconnect various membership-only services provided by the service server 400, continuity of service can be improved.

Figure 2:
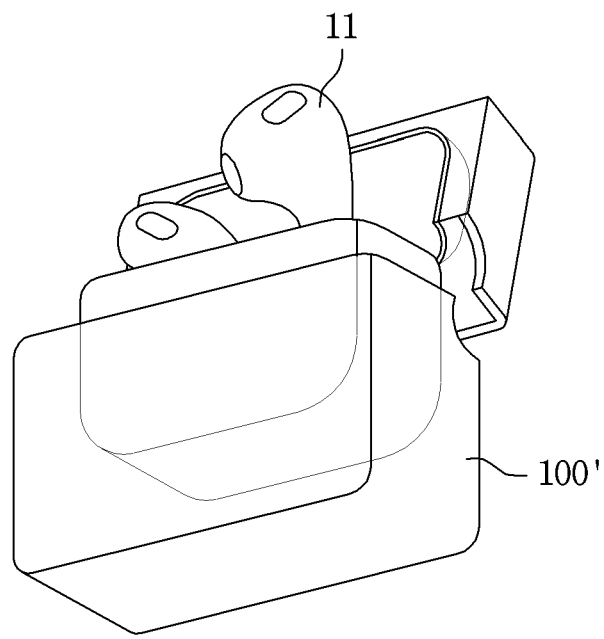
FIG. 2 is another exemplary view showing an accessory applied to a smart terminal accessory-based membership-only service platform according to an embodiment of the present inventive concept.

FIG. 2 is another exemplary view showing an accessory applied to a smart terminal accessory-based membership-only service platform according to an embodiment of the present inventive concept.

Referring to FIG. 2, the smart terminal accessory 100' may be a wireless earphone case. The wireless earphone case may include a charger of a wireless earphone 11. In this case, the smart terminal accessory 100' may be tagged to the user terminal 200 at the time of initial purchase or when registration is desired.

The smart terminal accessory 100' may be continuously used to charge the wireless earphone 11.

As described above, as the smart terminal accessory-based membership-only service platform 10 according to an embodiment of the present inventive concept applies the smart terminal accessory 100 to the smart terminal of a user so that the accessory may be seen each time it is used or may be easily identified by other people, and thus may provide a sense of belonging as a special member or a sense of satisfaction with a special service, loyalty of membership can be improved.

In addition, as the smart terminal accessory-based membership-only service platform 10 according to an embodiment of the present inventive concept may continuously use the smart terminal accessory 100 according to its usage and continuously provide associated services at the same time, and thus may reduce the amount of waste of NFC tags, it may contribute to improving the environment.

Figure 3:
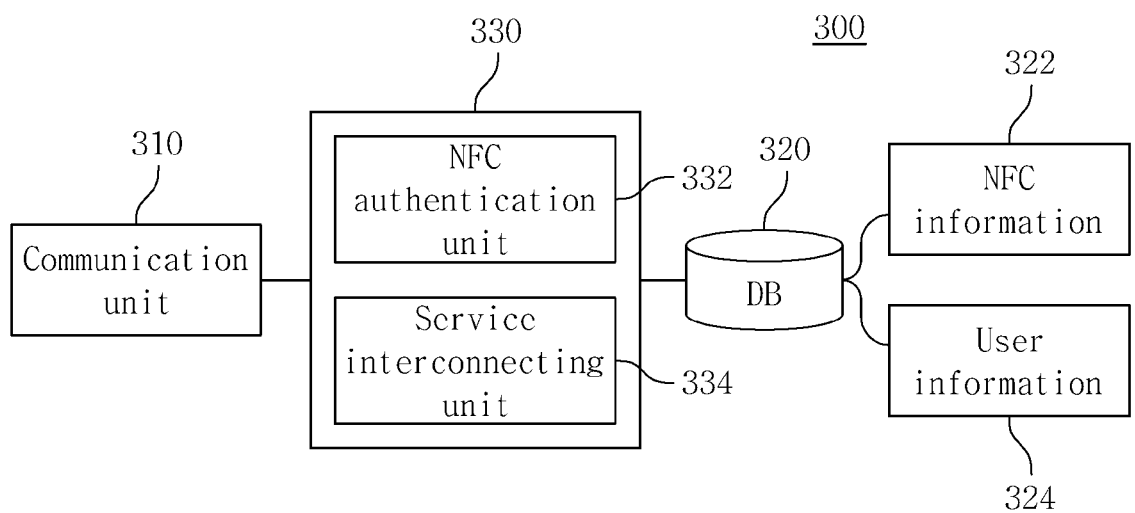
FIG. 3 is a block diagram showing a management server of a smart terminal accessory-based membership-only service platform according to an embodiment of the present inventive concept.

FIG. 3 is a block diagram showing a management server of a smart terminal accessory-based membership-only service platform according to an embodiment of the present inventive concept.

Referring to FIG. 3, the management server 300 may include a communication unit 310, a database 320, and a control unit 330.

The communication unit 310 may communicate with the user terminal 200 and the service server 400 through a wireless communication network. For example, the communication unit 310 may communicate with the user terminal 200 and the service server 400 through a 4G or 5G communication network.

The database 320 may store information related to the operation of the management server 300. The database 320 may include NFC information 322 and user information 324.

The NFC information 322 may be identification information of the NFC tag 110 issued by the management server 300. That is, the NFC information 322 may be information referenced when NFC authentication is requested from the user terminal 200.

The user information 324 may be information on a user registered as a real owner through NFC authentication. The user information 324 may be identification information of the user terminal 200 NFC-authenticated by the management server 300.

The control unit 330 is communicatively connected to the communication unit 310 and the database 320 and may control the overall operation of the management server 300. This control unit 330 may include an NFC authentication unit 332 and a service interconnecting unit 334.

When a request for authenticating the identified NFC information is received from the user terminal 200, the NFC authentication unit 332 may authenticate the identified NFC information according to identification information of the NFC tag in the database 320. That is, the NFC authentication unit 332 may perform authentication by comparing the NFC information transmitted from the user terminal 200 with the NFC information 322 in the database 320.

The service interconnecting unit 334 may determine the user terminal 200 requesting authentication of the NFC tag as the real owner of the smart terminal accessory 100 in correspondence to the NFC information and register the user terminal 200 as a user. That is, the service interconnecting unit 334 may register the user terminal 200 authenticated by the NFC authentication unit 332 as a legitimate user of the smart terminal accessory 100.

The service interconnecting unit 334 may provide an application related to the membership-only service to the authenticated and registered user terminal 200. That is, the service interconnecting unit 334 may provide an application related to the membership-only service to the user terminal 200 to install.

The service interconnecting unit 334 may request, from the service server 400, membership registration and a special contract for the user terminal 200 registered as a user. Here, the special contract may be a previously agreed special service to be provided by the service server 400 in association with NFC information. At this point, the service interconnecting unit 334 may transmit the registered user information and a membership-only service related to the NFC information to the service server 400. That is, the service interconnecting unit 334 may transmit identification information of the user terminal 200 to the service server 400 to be registered as a member of the service server 400. In addition, the service interconnecting unit 334 may request the service server 400 to provide a previously agreed special contract to the corresponding user terminal 200.

As described above, as the smart terminal accessory-based membership-only service platform 10 according to an embodiment of the present inventive concept provides NFC authentication, membership registration, and applications simply by applying the smart terminal accessory 100 to the smart terminal of a user, and thus may be easily used without the need of special handling or setting, convenience of use and scalability can be improved.

Hereinafter, the smart terminal accessory-based membership-only service method of the present inventive concept will be described with reference to FIG. 4.

FIG. 4 is a flowchart illustrating a smart terminal accessory-based membership-only service method according to an embodiment of the present inventive concept.

Referring to FIG. 4, a smart terminal accessory-based membership-only service method 20 includes the steps of authenticating by tagging an NFC (S21 to S24), registering a user (S2 to S27), registering membership (S28 and S29), and providing a membership-only service (S30 and S31).

Describing in more detail, as shown in FIG. 4, first, the smart terminal accessory 100 NFC-tags the user terminal 200 (step S21). Here, the smart terminal accessory 100 may be embedded with an NFC tag 110. At this point, the user terminal 200 may be equipped with the smart terminal accessory 100 or placed near the smart terminal accessory 100.

Next, the user terminal 200 identifies the NFC tag (step S22). At this point, the user terminal 200 may be in a state in which the NFC function is activated. That is, the user terminal 200 may receive and identify NFC information stored in the NFC tag 110. Here, the NFC information may be NFC identification information.

Next, the user terminal 200 requests NFC authentication from the management server 300 (step S23). Here, the user terminal 200 may access the IP address of the management server 300 included in the NFC information. At this point, the user terminal 200 may transmit its own identification information to the management server 300, together with the identified NFC information. For example, the user terminal 200 may transmit the phone number of its smart terminal to the management server 300 as identification information.

Next, the management server 300 authenticates the NFC information requested from the user terminal 200 (step S24). At this point, the management server 300 may authenticate according to previously stored identification information of the NFC tag. That is, the management server 300 may perform authentication by comparing the NFC information transmitted from the user terminal 200 with the NFC information 322 in the database 320.

Next, the management server 300 registers the user terminal 200 as a user of the smart terminal accessory 100 (step S25). At this point, the management server 300 may determine the user terminal 200 that has requested NFC authentication as the real owner of the smart terminal accessory 100 in correspondence to the NFC information and register the user terminal 200 as a user. That is, the management server 300 may register the NFC-authenticated user terminal 200 as a legitimate user of the smart terminal accessory 100.

Next, the management server 300 provides an application related to the membership-only service to the user terminal 200 to install (step S26). Here, the membership-only service may be a membership-only service associated with the authenticated NFC information. That is, the management server 300 may provide an application related to the membership-only service to the user terminal 200 to install.

Next, the user terminal 200 may receive and install the application provided from the management server 300 (step S27). Here, the application may be an application related to a membership-only service corresponding to the NFC information. That is, the user terminal 200 may be provided with services of the service server 400 through the installed application.

The management server 300 may request, from the service server 400, membership registration and a special contract for the user terminal 200 registered as a user (step S28). At this point, the management server 300 may transmit the registered user information and a membership-only service related to the NFC information to the service server 400. That is, the management server 300 may transmit identification information of the user terminal 200 to the service server 400 to be registered as a member of the service server 400. In addition, the management server 300 may request the service server 400 to provide a previously agreed special contract to the corresponding user terminal 200.

The service server 400 registers the user terminal 200 as a member in response to a request from the management server 300 (step S29). That is, the service server 400 may register the user terminal 200 as a member corresponding to the authenticated NFC information in response to a request from the management server 300. Here, the service server 400 may register the identification information of the user terminal 200 as membership information.

At this point, the service server 400 may match a special contract requested from the management server 300 with the user terminal 200. Here, the special contract may be a previously agreed special service to be provided by the service server 400 in association with the NFC information. For example, the special contract may include additional services provided through specially progressed events or promotions, in addition to the services provided by signing up as a general member. That is, the service server 400 may match to provide a special contract previously agreed with the management server 300 to the user terminal 200 of corresponding membership. At this point, the service server 400 may interact with the user terminal 200 according to registration of membership of the user terminal 200.

Next, the user terminal 200 requests a membership-only service from the service server 400 (step S30). At this point, the user terminal 200 may request a registered special contract service through the management server 300. That is, the user terminal 200 may request a membership-only service matched as a special contract from the management server 300.

Next, the service server 400 provides a membership-only service matched in correspondence to the smart terminal accessory 100 in response to a request for the membership-only service of the user terminal 200 (step S31). That is, the service server 400 may provide a previously agreed special contract service to the user terminal 200.

Meanwhile, the service server 400 may provide follow-up services or associated services related to the special contract service to the user terminal 200, regardless of the request of the user terminal 200. For example, when a new promotion is generated for specific members, the service server 400 may provide the new promotion to corresponding user terminals 200.

A smartphone accessory-based membership-only service method including the step of providing the matched membership-only service to the user terminal in response to a request of the user terminal.

The methods as described above may be implemented by the smart terminal accessory-based membership-only service platform 10 as shown in FIG. 1, and particularly, may be implemented as software programs performing these steps, and in this case, these programs may be stored in a computer-readable recording medium or transmitted by a computer data signal combined with a carrier wave through a transmission medium or communication network.

At this point, the computer-readable recording medium includes all types of recording devices in which data that can be read by a computer system is stored, and it may be, for example, ROM, RAM, CD-ROM, DVD-ROM, DVD-RAM, a magnetic tape, a floppy disk, a hard disk, an optical data storage device, or the like.

Although an embodiment of the present inventive concept has been described above, the spirit of the present inventive concept is not limited to the embodiment presented in this specification, and although those skilled in the art may easily suggest other embodiments by adding, changing, deleting, or adding constitutional components within the scope of the same spirit, it can be said that this also falls within the scope of the present inventive concept.

DESCRIPTION OF SYMBOLS

| | |
|---|---|
| 10: Smart terminal accessory-based membership-only service platform | |
| 100: Smart terminal accessory | 110: NFC tag |
| 200: User terminal | 300: management server |
| 310: Communication unit | 320: Database |
| 330: Control unit | 332: NFC authentication unit |
| 334: Service interconnecting unit | 400: Service server |

What is claimed is:

1. A smartphone accessory-based membership-only service platform comprising:
   a management server for authenticating NFC information requested from a user terminal that identifies an NFC tag from a smart terminal accessory embedded with the NFC tag by means of NFC tagging, and registering the user terminal as a user of the smart terminal accessory; and
   a service server for registering and interconnecting the user terminal as a member in response to a request from the management server, and providing a membership-only service corresponding to the smart terminal accessory and requested from the user terminal.

2. The platform according to claim 1, wherein when a request for authenticating the identified NFC information is received from the user terminal, the management server is configured to authenticate the identified NFC information according to identification information of the NFC tag.

3. The platform according to claim 1, wherein the management server is configured to determine the user terminal requesting authentication of the NFC information as a real owner of the smart terminal accessory in correspondence to the NFC information and registers the user terminal as a user, and provide an application related to the membership-only service to the user terminal to install.

4. The platform according to claim 1, wherein the management server is configured to request registration of membership and setting of special contracts by transmitting the registered user information and a membership-only service related to the NFC information to the service server.

5. The platform according to claim 4, wherein the service server is configured to register the user terminal as a member corresponding to the NFC information in response to a request from the management server, match the user terminal and a corresponding special contract, and provide a membership-only service matched as a special contract in response to a request of the user terminal.

6. A smartphone accessory-based membership-only service method comprising the steps of:
   identifying an NFC tag from a smart terminal accessory embedded with the NFC tag by means of NFC tagging, by a user terminal;
   authenticating NFC information requested from the user terminal, by a management server;
   registering the user terminal as a user of the smart terminal accessory, by the management server;
   registering the user terminal as a member in response to a request from the management server, by the service server; and
   providing a membership-only service corresponding to the smart terminal accessory and requested from the user terminal, by the service server.

7. The method according to claim 6, wherein the authenticating step includes the steps of:
   receiving a request for authenticating the identified NFC information from the user terminal; and
   authenticating the identified NFC information according to identification information of the NFC tag.

8. The method according to claim 6, wherein the step of registering as a user includes the steps of:
   receiving a request for authenticating the NFC from the user terminal;
   determining the user terminal requesting authentication of the NFC information as a real owner of the smart terminal accessory in correspondence to the NFC information and registering the user terminal as a user; and providing an application related to the membership-only service to the user terminal to install.

9. The method according to claim 6, wherein the step of registering as a member includes the step of requesting registration of membership and setting of special contracts by transmitting the registered user information and a membership-only service related to the NFC information to the service server, by the management server.

10. The method according to claim 9, wherein the registering step includes the steps of:
- registering the user terminal as a member corresponding to the NFC information in response to a request from the management server; and
- matching the user terminal and a corresponding special contract, and the providing step includes the steps of:
- receiving a request for a membership-only service matched to a corresponding special contract from the user terminal; and
- providing the matched membership-only service to the user terminal in response to the request of the user terminal.

\* \* \* \* \*